US008426055B2

(12) United States Patent
Choi et al.

(10) Patent No.: US 8,426,055 B2
(45) **Date of Patent: *Apr. 23, 2013**

(54) APPARATUS FOR STORING ENERGY AND METHOD FOR MANUFACTURING THE SAME

(75) Inventors: Dukhyun Choi, Hwaseong-si (KR); Sang Yoon Lee, Seoul (KR); Jaeyoung Choi, Suwon-si (KR); Hansu Kim, Seoul (KR); Sangwoo Kim, Gumi-si (KR)

(73) Assignees: Samsung Electronics Co., Ltd. (KR); Kumoh National Institute of Technology (KR)

( * ) Notice: Subject to any disclaimer, the term of this patent is extended or adjusted under 35 U.S.C. 154(b) by 1069 days.

This patent is subject to a terminal disclaimer.

(21) Appl. No.: 12/408,274

(22) Filed: Mar. 20, 2009

(65) Prior Publication Data

US 2010/0136414 A1 Jun. 3, 2010

(30) Foreign Application Priority Data

Dec. 2, 2008 (KR) ........................ 10-2008-0121493

(51) Int. Cl.
*H01M 6/42* (2006.01)

(52) U.S. Cl.
USPC ............................ 429/156; 429/121; 429/161

(58) Field of Classification Search .................. 429/156, 429/121, 161
See application file for complete search history.

(56) References Cited

U.S. PATENT DOCUMENTS

2008/0003839 A1* 1/2008 Park et al. ..................... 438/800

FOREIGN PATENT DOCUMENTS

KR 1020080053708 6/2005
KR 1020070027233 3/2007
KR 1020080052296 A 6/2008

OTHER PUBLICATIONS

"Direct-Current Nanogenerator Driven by Ultrasonic Waves"; Authors: Xudong Wang, et al.; Science, vol. 316 (Apr. 6, 2007).
"Piezoelectric Nanogenerators Based on Zinc Oxide Nanowire Arrays"; Authors: Zhong Lin Wang, et al.; Science, vol. 312 (Apr. 14, 2006).
"Microfibre-nanowire hybrid structure for energy scavenging"; Authors: Yong Qin, et al.; Nature, vol. 451; (Feb. 14, 2008).
"Voltage Generation from Individual BaTiO3 Nanowires under Periodic Tensile Mechanical Load"; Authors: Zhaoyu Wang, et al.; NANO Letters, vol. 7, No. 10, pp. 2966-2969 (2007).
"Integrated Nanogenerators in Biofluid"; Authors: Xudong Wang, et al.; NANO Letters, vol. 7, No. 8. pp. 2475-2479 (2007).
Gao et al; "Nanowire Piezoelectric Nanogenerators on Plastic Substrates as Flexible Power Sources for Nanodevices" Advanced Materials, 2007, 19, pp. 67-72.
U.S. Appl. No. 13/034,041 "Apparatus for Generating Electrical Energy and Method for Manufacturing the Same" filed Feb. 24, 2011.
U.S. Appl. No. 12/482,147 "Apparatus for Generating Electrical Energy and Method for Manufacturing the Same" filed Jun. 10, 2009.
U.S. Appl. No. 12/535,967 "Apparatus for Generating Electrical Energy and Method for Manufacturing the Same" filed Aug. 5, 2009.

* cited by examiner

*Primary Examiner* — Jane Rhee
(74) *Attorney, Agent, or Firm* — Cantor Colburn LLP

(57) ABSTRACT

An apparatus for storing energy may include: a plurality of nanowire cells electrically connected to each other; and a storage for storing electrical energy generated from the nanowire cells. Each of the plurality of nanowire cells may include: first and second electrodes disposed at an interval; and a nanowire, which is disposed between the first and the second electrodes and made of a piezoelectric material. The plurality of nanowire cells may be electrically connected, so that voltage or current may be increased. Therefore, wireless recharging of the storage connected to the nanowire cells with electrical energy may be enabled.

10 Claims, 26 Drawing Sheets

1,2
2000
Storage
1000
A
A'

APPARATUS FOR STORING ENERGY AND METHOD FOR MANUFACTURING THE SAME

CROSS-REFERENCE TO RELATED APPLICATION

This application claims priority to Korean Patent Application No. 10-2008-121493, filed on Dec. 2, 2008, and all the benefits accruing therefrom under 35 U.S.C. §119, the contents of which in its entirety are herein incorporated by reference.

BACKGROUND

1. Field

Disclosed herein is an apparatus for storing energy and a method for manufacturing the apparatus for storing energy.

2. Description of the Related Art

With the recent advent of miniaturized high-performance devices in the field of electronics, nanoscale devices have become more prevalent. In order to manufacture nanodevices, a technique of producing nanowires has been developed. A nanowire is a wire with a diameter of several tens of nanometers. The nanowire may have an aspect ratio about 10 to about several thousands.

The nanowire may have electrical, chemical, physical and optical properties that are different from the general properties of the same material when it is in bulk form. By using the molecular properties of the nanowires in conjunction with some of the bulk properties, more miniaturized and integrated devices may be implemented. The nanowires may be used in various fields such as laser, transistor, memory, sensor, and the like.

More recently, miniaturization is being combined with versatility and mobility to produce mobile devices that can perform a variety of different functions. In order to produce sustainable mobile devices, batteries having an adequate power supply are desirable. However, the development of battery capacity for power supply presently appears to lag behind the integration of functionality into these devices. Therefore, the use of an auxiliary battery is desirable, and the development of the auxiliary battery as an emergency power source, which enables wireless recharge may also be desirable.

SUMMARY

Disclosed herein is an apparatus for storing energy and a method for manufacturing the apparatus. The apparatus for storing energy may generate electrical energy by using nanowires and increase voltages or currents of the generated electrical energy so as to store the electrical energy.

Disclosed herein too is an apparatus for storing energy that includes a plurality of nanowire cells electrically connected to each other; and a storage for storing electrical energy generated in the plurality of nanowire cells. Each of the plurality of nanowire cells may include: first and second electrodes disposed at an interval apart from each other; and a nanowire which is disposed between the first and the second electrodes and made of a piezoelectric material.

Disclosed herein too is a method for manufacturing an apparatus for storing energy. The method for manufacturing an apparatus for storing energy includes providing a plurality of first electrodes electrically separated from each other and a nanowire disposed on each of the first electrodes; forming a plurality of nanowire cells electrically connected to each other by arranging a plurality of second electrodes which face the respective first electrodes and are electrically separated from each other; and connecting a storage to the plurality of nanowire cells.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
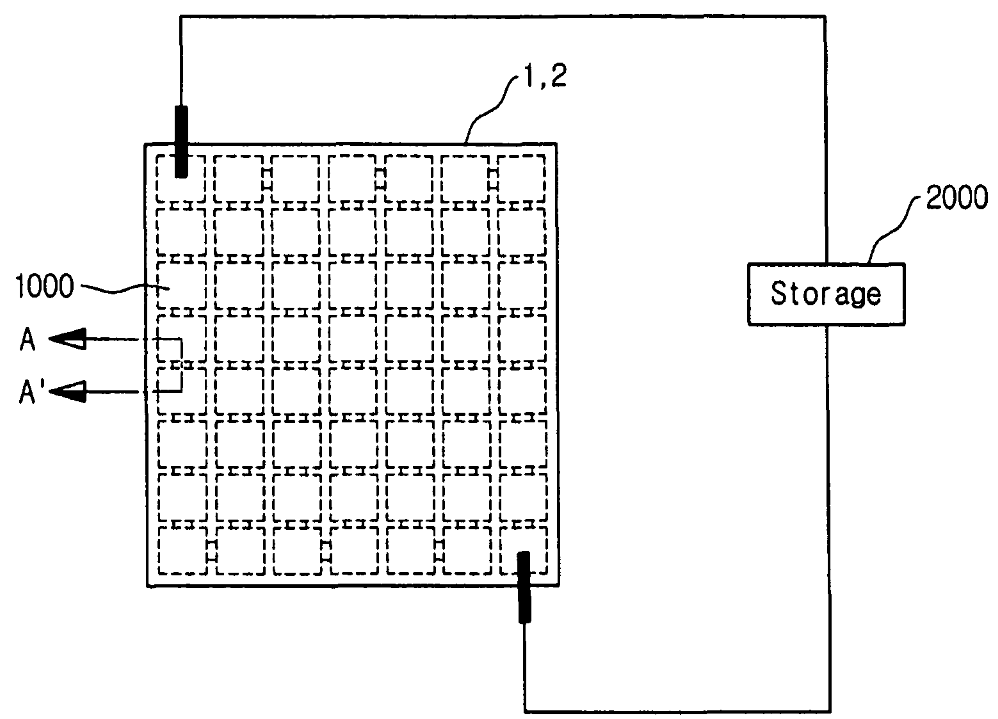
FIG. 1 is an exemplary schematic plan view illustrating the apparatus for storing energy.

Aspects, advantages, and features of the present invention and methods of accomplishing the same may be understood more readily by reference to the following detailed description of preferred embodiments and the accompanying drawings. The present invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings. However, the aspects, features, and advantages of the present invention are not restricted to the ones set forth herein. The above and other aspects, features and advantages of the present invention will become more apparent to one of ordinary skill in the art to which the present invention pertains by referencing a detailed description of the present invention given below.

In the drawings, like reference numerals in the drawings denote like elements. The shape, size and regions, and the like, of the drawing may be exaggerated for clarity.

FIG. 1 is an exemplary plan view illustrating the apparatus for storing energy.

Referring to FIG. 1, the apparatus for storing energy may include a plurality of nanowire cells 1000 and a storage 2000. The number of nanowire cells 1000 described and illustrated in the figure is only exemplary, and the number of nanowire cells 1000 of the apparatus for storing energy may be different depending on the type of the apparatus for storing energy and the amount of desired electrical energy.

The plurality of nanowire cells 1000 may be in electrically communication with each other. In one embodiment, the nanowire cells 1000 may be connected in series or in parallel. The nanowire cells 1000 may be arranged on a single plane. For example, the nanowire cells 1000 may be arranged on the same substrate 1. Alternatively, each of the nanowire cells 1000 may be disposed on different substrates. The plurality of nanowire cells 1000 may be arranged in a vertical direction or in another suitable direction in a given space.

Each of the nanowire cells 1000 may include a plurality of electrodes spaced apart from each other and a nanowire disposed between the electrodes. When stress, bending, vibration, electromagnetic waves, or the like, are applied to the nanowire cell 1000, electrical energy can be generated by the mechanical movement of the nanowire in response to them. The nanowire cell 1000 will be described later in detail with reference to FIG. 2.

The storage 2000 may be connected to one or more of the nanowire cells 1000 that are electrically connected to each other. For example, the storage 2000 may be connected to the nanowire cells 1000 disposed at both ends from among the nanowire cells 1000 that are connected in series. The storage 2000 may store electrical energy generated by the nanowire cells 1000. The storage 2000 may include a rechargeable battery or a capacitor. For example, the storage 2000 may include a nickel-cadmium battery, a nickel-hydrogen battery, a lithium ion battery, or a lithium polymer battery.

The amount of electrical energy generated by the single nanowire cell 1000 may be smaller than the level of electrical energy for charging the storage 2000. For example, the rechargeable battery or the capacitor may be charged when power at a predetermined or higher voltage is applied. To this end, by electrically connecting the plurality of nanowire cells 1000, the voltage or current applied to the storage 2000 may be increased.

For example, when the nanowire cells 1000 are connected in series, the voltages generated by the nanowire cells 1000 may be added together. As a result, the total voltage applied to the storage 2000 may be increased. On the other hand, when the nanowire cells 1000 are connected in parallel, the currents generated by the nanowire cells 1000 may be added together. As a result, the total current flowing to the storage 2000 may be increased.

The storage 2000 may include an amplifier (not shown). The voltage of the electrical energy generated by the nanowire cells 1000 may further be amplified by using the amplifier.

Figure 2:
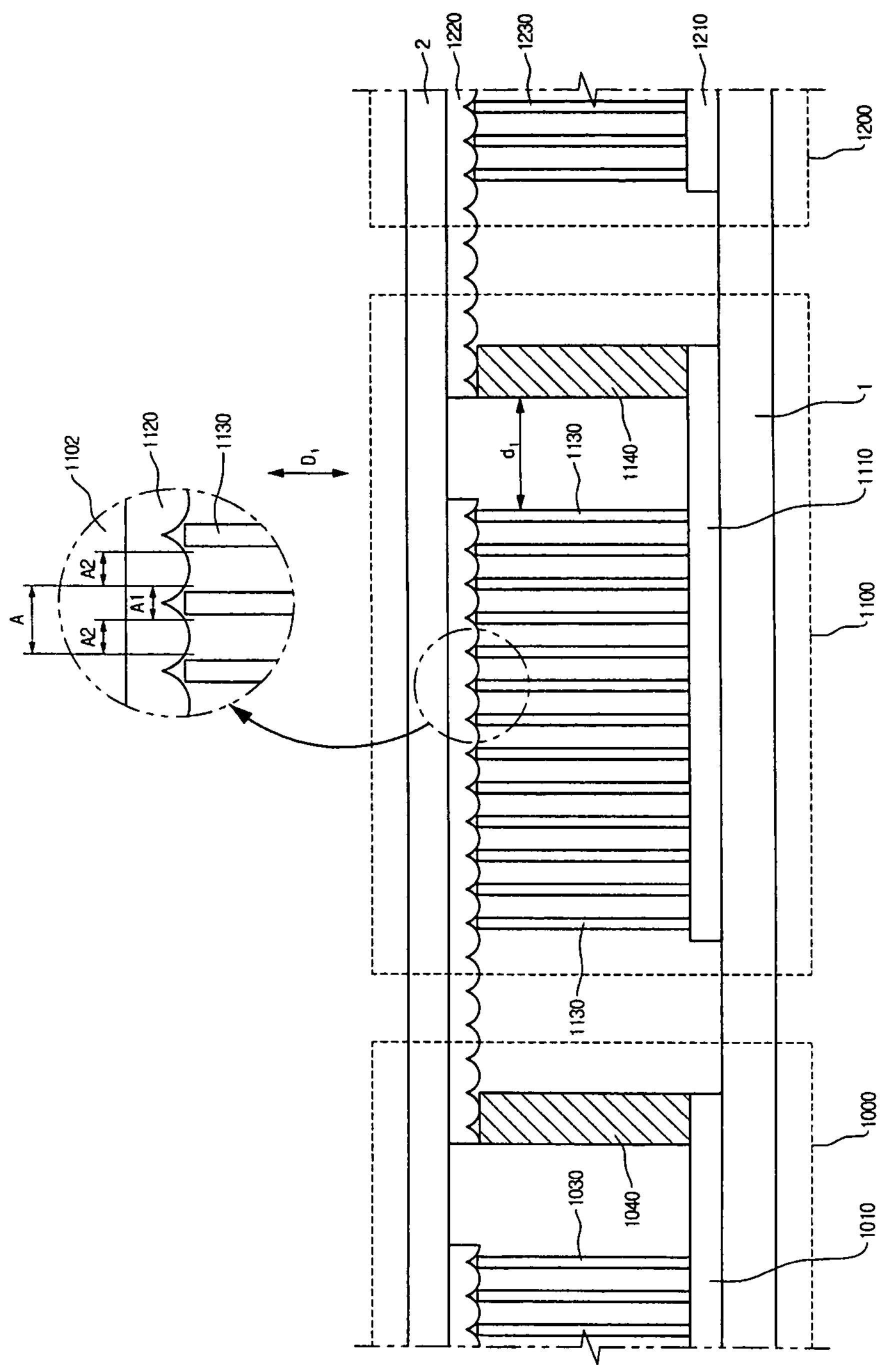
FIG. 2 is an exemplary schematic sectional view illustrating the apparatus for storing energy illustrated in FIG. 1 taken along line A-A'.

FIG. 2 is a sectional view illustrating the apparatus for storing energy illustrated in FIG. 1 taken along line A-A'.

Referring to FIG. 2, the nanowire cell 1000 may include a first electrode 1100, a second electrode 1120, and a nanowire 1130. The nanowire cells 1000 and 1200 adjacent to the nanowire cell 1100 may have the same structure as the nanowire cell 1100.

The first electrode 1110 may be a lower electrode supporting the nanowire 1130. The first electrode 1110 may comprise metal, indium tin oxide (ITO), carbon nanotubes (CNT), or other suitable electrically conductive materials. The first electrode 1110 may be formed on the substrate 1. The substrate may comprise glass, silicon (Si), polymer, sapphire, gallium nitride (GaN), silicon carbide (SiC), or other suitable materials. For example, the first electrode 1110 may include a metal film or an electrically conductive ceramic formed on the substrate 1.

The first electrode 1110 may function as a substrate, in addition to being an electrode. For example, when a nonconductive sapphire substrate is used as the first electrode 1110 and the nanowires 1130 comprise zinc oxide (ZnO), a electrically conductive ZnO thin film may be formed on the sapphire substrate before the growth of the nanowire 1130. In this case, since the ZnO thin film can serve as the electrode, the sapphire substrate may function as the first electrode 1110. Alternatively, since substrates comprising GaN or SiC are electrically conductive, the substrate may serve as the first electrode 1110 without an additional electrically conductive thin film.

The second electrode 1120 may face the first electrode 1110 and is disposed at an interval (that is proportional to the length of the nanowires 1130) apart from the first electrode 1110. The second electrode 1120 may be made of metal, ITO, CNT, or other suitable electrically conductive materials, similarly to the first electrode 1110. The second electrode 1120 may be formed on a substrate 2, or the second electrode 1120 may be formed as a substrate.

The second electrode 1120 may include an uneven portion A. As can be seen in the FIG. 2, the uneven portion faces the first electrode 1110. For example, the uneven portion A of the second electrode 1120 may have a structure that has a ripple shape, the ripple shape including one or more concave portions A1 and one or more convex portions A2. The uneven portion A may include a curved surface or an inclined surface. For example, the second electrode 1120 may include the uneven portion A having a semicircular cross-section. When the second electrode 1120 includes the uneven portion A, the nanowire 1130 may be disposed adjacent to the concave portion A1 of the uneven portion A. Alternatively, the second electrode 1120 may not include the uneven portion A. For example, the second electrode 1120 may have the shape of a flat plate.

One or more nanowires 1130 may be disposed between the first and the second electrodes 1110 and 1120. The nanowire 1130 may be formed on the first electrode 1110. In addition, the nanowire 1130 may extend in a direction $D_1$ perpendicular to a surface of the first and the second electrodes 1110 and 1120. Alternatively, the nanowire 1130 may be inclined at an angle that is not perpendicular with respect to a surface of the first and the second electrodes 1110 and 1120. An upper end of the nanowire 1130 may be separated from the second electrode 1120 by a selected distance or may contact the second electrode 1120. The number of the nanowires 1130 per unit area of the electrodes may be different depending on the size and the application of the apparatus.

The nanowire 1130 is made of a piezoelectric material. When the nanowire 1130 made of the piezoelectric material is bent, the nanowire 1130 exhibits the piezoelectric effect. Specifically, each portion of the nanowire 1130 to which external stress (pressure, vibration, and the like) is exerted may have a predetermined electric potential depending on whether compressive stress or tensile stress is applied to the corresponding portion.

As an example of the piezoelectric material, the nanowire 1130 may comprise ZnO. When the nanowire 1130 comprising ZnO is subjected to stress (e.g., bent), each portion of the nanowire 1130 may have a predetermined electric potential due to an asymmetrical crystal structure of ZnO. Besides ZnO, the nanowire 1130 may be made of another piezoelectric material that exhibits the piezoelectric effect in response to applied stress. For example, the nanowire 1130 may comprise lead zirconate titanate (PZT) or barium titanate ($BaTiO_3$).

When the nanowire 1130 made of the piezoelectric material is bent, a potential difference may be generated in the nanowire 1130 between a portion to which a compressive stress is applied and a portion to which a tensile stress is applied. For example, the portion of the nanowire 1130 to which the compressive stress is applied may have a negative electric potential and the portion of the nanowire 1130 to which the tensile stress is applied may have a positive electric potential. When the portion of the nanowire 1130 to which the compressive stress or the tensile stress is applied contacts the second electrode 1120, current may flow between the second electrode 1120 and the nanowire 1130. Further, when the nanowire 1130 comprises the piezoelectric material, which is a semiconductor, a Schottky diode may be formed between the nanowire 1130 and the second electrode 1120.

A connecting electrode 1140 may be disposed on the first electrode 1110. The connecting electrode 1140 may comprise a metal, ITO, CNT, or other suitable electrically conductive materials. The first electrode 1110 of the nanowire cell 1100 may be electrically connected to the second electrode 1220 of the adjacent nanowire cell 1200 via the connecting electrode 1140. Similarly, the second electrode 1120 of the nanowire cell 1100 may be electrically connected to a connecting electrode 1040 of the nanowire cell 1000.

To prevent electrical failure, the connecting electrode 1140 and the nanowire 1130 may be disposed at a predetermined interval $d_1$. For example, by separating the connecting electrode 1140 from the nanowire 1130, the adjacent second electrodes 1020, 1120, and 1220 may be prevented from being electrically connected to each other.

When the nanowire 1130 is bent by a stress applied to the nanowire cell 1100 or when the nanowire 1130 resonates by an applied electromagnetic wave, current may flow between the second electrode 1120 and the first electrode 1110 through the nanowire 1130. The first electrode 1110 may be connected to the second electrode 1220 via the connecting electrode 1140. Therefore, the current that flows to the first electrode 1110 of the nanowire cell 1100 may flow to the adjacent nanowire cell 1200 through the connecting electrode 1140.

The nanowire cells 1000, 1100, and 1200 may be divided into pre-nanowire cells and post-nanowire cells based on the direction of the flow of current. For example, of the nanowire cells 1000 and 1100, the nanowire cell 1000 is the pre-nanowire cell and the nanowire cell 1100 is the post-nanowire cell. Similarly, of the nanowire cells 1100 and 1200, the nanowire cell 1100 is the pre-nanowire cell and the nanowire cell 1200 is the post-nanowire cell. In the apparatus for storing energy, the pre-nanowire and the post-nanowire cells may be electrically connected to each other via the connecting electrodes 1040 and 1140. Therefore, the plurality of nanowire cells 1000, 1100, and 1200 may be connected in series.

Figure 3A:
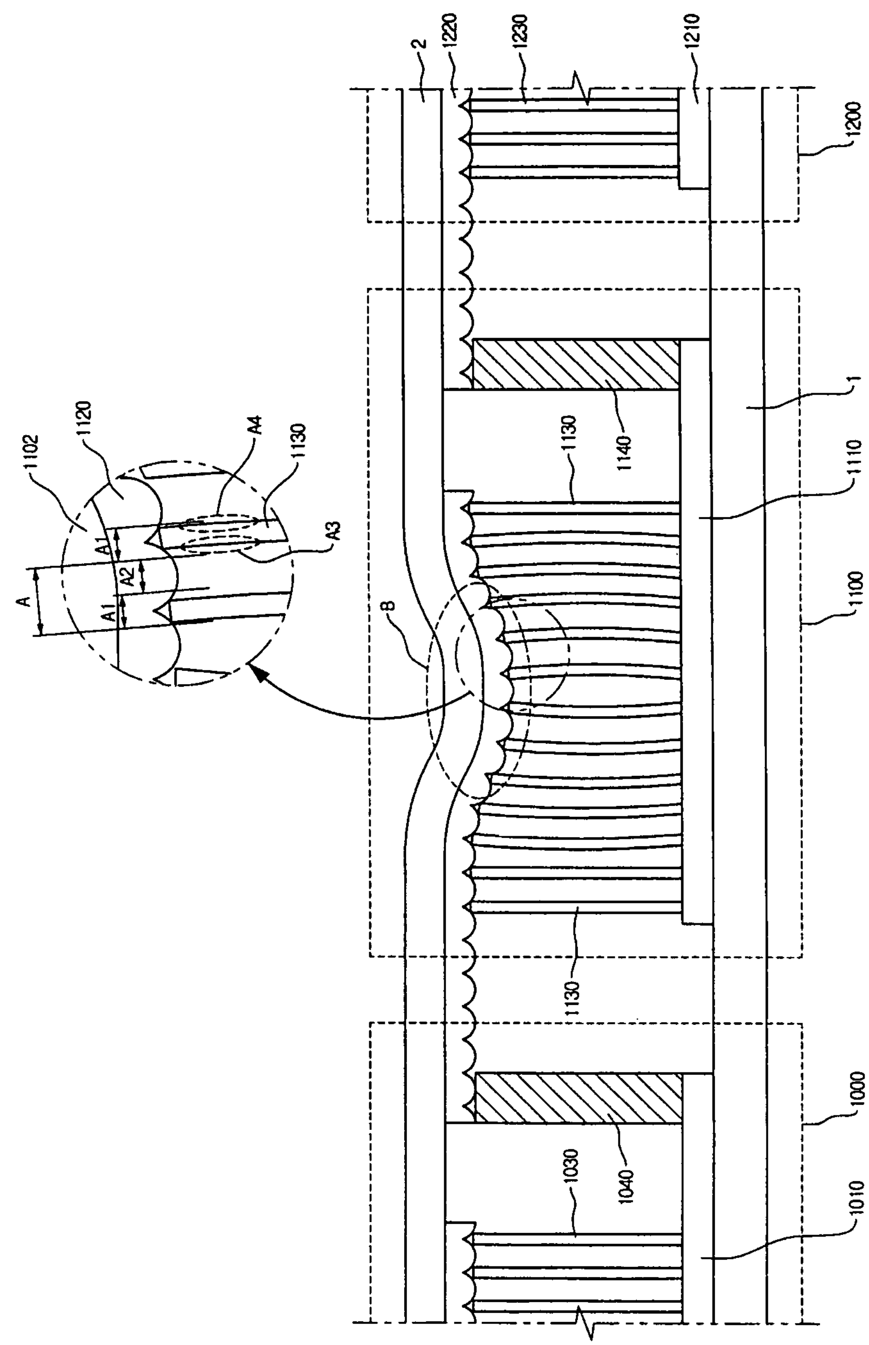
FIG. 3A is an exemplary schematic sectional view illustrating the apparatus for storing energy taken along line A-A' of FIG. 1 in the case where stress is applied to the apparatus.

FIG. 3A is a sectional view illustrating the apparatus for storing energy taken along line A-A' of FIG. 1 in the case where stress is applied to the apparatus.

Referring to FIG. 3A, as the stress is applied to the upper portion of the nanowire cell 1100, the substrate 2 of the nanowire cell 1100 and a portion B of the second electrode 1120 may be bent. As a result, the distance between the first and the second electrodes 1110 and 1120 decreases, and the nanowire 1130 between the first and the second electrodes 1110 and 1120 may be depressed and bent in a longitudinal direction.

The bent nanowire 1130 may partially come in contact with the second electrode 1120. The nanowire 1130 and the second electrode 1120 may be disposed at such an interval that the nanowire 1130 comes in contact with the second electrode 1120 when a stress is applied. Alternatively, the nanowire 1130 may be in contact with the second electrode 1120 in a normal condition.

A portion A3 of the nanowire 1130 to which a compressive stress is applied may have a negative electric potential. On the other hand, the second electrode 1120 does not have an electric potential. When the nanowire 1130 comprises ZnO which is originally a N-type semiconductor without doping processes, a forward-biased Schottky diode may be formed between the portion A3 having a negative electric potential and the second electrode 1120. Accordingly, current can flow from the second electrode 1120 to the nanowire 1130. A portion A4 of the nanowire 1130 to which a tensile stress is applied may have a positive electric potential. Accordingly, a reverse-biased Schottky diode may be formed between the portion A4 having a positive electric potential and the second electrode 1120. Therefore, current does not flow between the portion A4 and the second electrode 1120.

On the other hand, when the nanowire 1130 comprises a piezoelectric material, which is a P-type semiconductor, a forward-biased Schotty diode may be formed between the portion A4 having a positive electric potential and the second electrode 1120. Accordingly, current can flow from the portion A4 to the second electrode 1120. A reverse-biased Schottky diode may be formed between the portion A3 having a negative electric potential and the second electrode 1120. Therefore, current does not flow between the portion A3 and the second electrode 1120.

In another exemplary embodiment, a Schottky diode may not be formed between the nanowire 1130 and the second electrode 1120. In this case, as the bent nanowire 1130 contacts the second electrode 1120, current may flow either from the nanowire 1130 to the second electrode 1120 or from the second electrode 1120 to the nanowire 1130 depending on the difference in electric potentials.

The same effect as described above may be obtained in a large number of nanowires when the stress is applied to one or more of the first and the second electrodes 1110 and 1120. Specifically, by pressing portions of the first and the second electrodes 1110 and 1120 or bending the first and the second electrodes 1110 and 1120, the same effect may be obtained on a larger scale.

When stress is applied to the plurality of nanowire cells 1000, 1100, and 1200, the voltages generated from each of the nanowire cells 1000, 1100 and 1200 may be added as a result of which the total voltage is increased. Alternatively, when the plurality of nanowire cells 1000, 1100, and 1200 are connected in parallel, current generated from each of the nanowire cells 1000, 1100, and 1200 may be added as a result of which the total current may be increased.

Figure 3B:
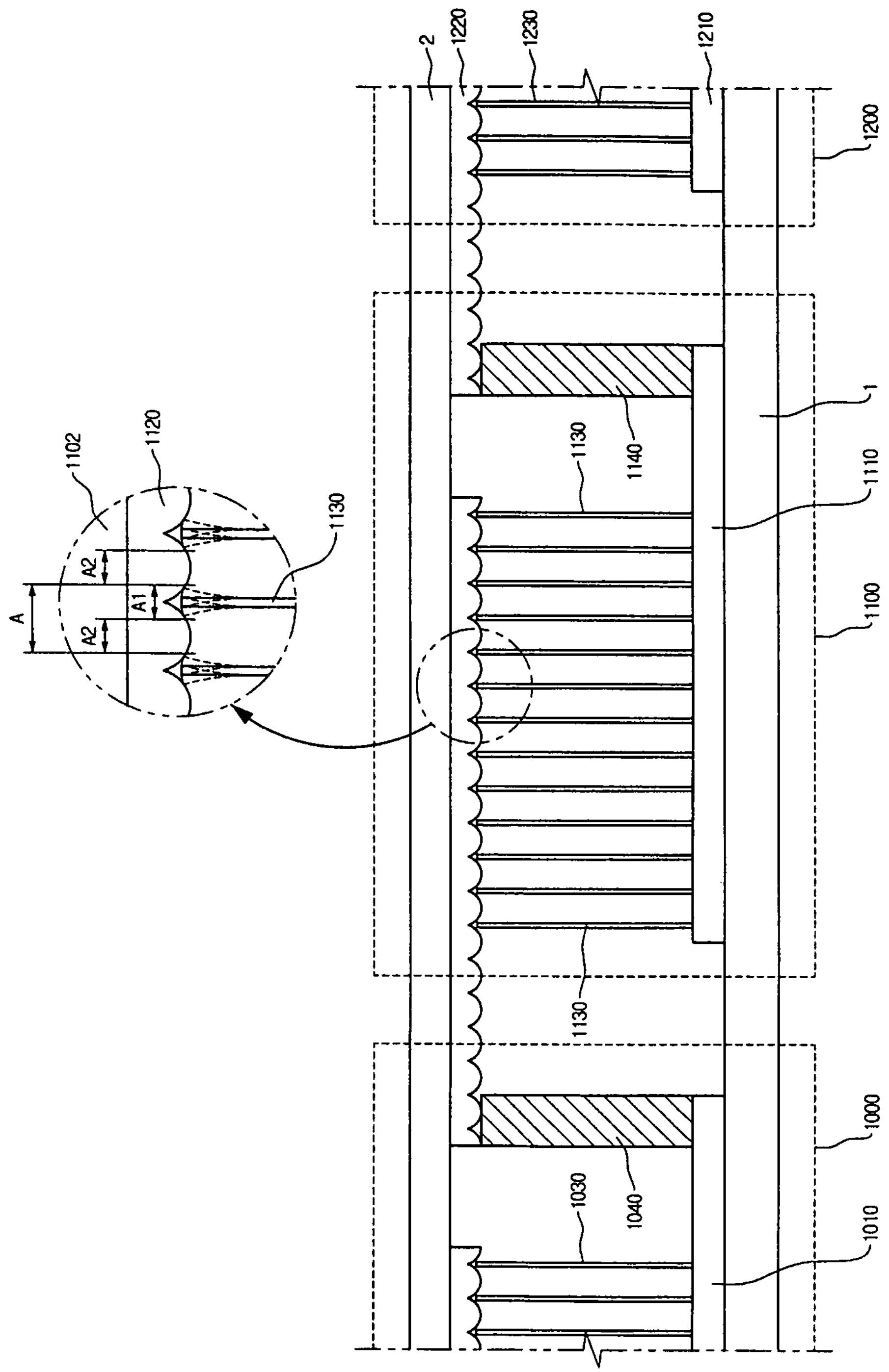
FIG. 3B is an exemplary schematic sectional view illustrating the apparatus for storing energy taken along line A-A' of FIG. 1 in the case where an electromagnetic wave is applied to the apparatus.

FIG. 3B is a sectional view illustrating the apparatus for storing energy taken along line A-A' of FIG. 1 in the case where a signal having a predetermined frequency is applied to the apparatus and the nanowire resonates.

Referring to FIG. 3B, the nanowire 1130 may be disposed at a distance from the second electrode 1120. The distance is selected so that the nanowire 1130 can contact the second electrode 1120 when it vibrates as a result of being subjected to a resonant frequency. When the signal corresponding to the resonance frequency of the nanowire 1130 is applied to the apparatus for storing energy, the nanowire 1130 may resonate and vibrate in both directions.

The bent nanowire 1130 may come in contact with the second electrode 1120. As described above, the portion of the bent nanowire 1130 to which the compressive stress is applied may have a negative electric potential. Therefore, current may flow from the second electrode 1120 to the first electrode 1110 through the nanowire 1130.

As described above, the nanowire cells 1000, 1100, and 1200 may generate electrical energy from the mechanical movement of the nanowires 1030, 1130, and 1230 in response to the applied stress, vibration, resonance, or the like. In addition, since the nanowire cells 1000, 1100, and 1200 are electrically connected to each other, the currents or the voltages generated by the nanowire cells 1000, 1100, and 1200 may be added to each other depending upon their mode of connection (i.e., series or parallel). Therefore, the current or the voltage supplied to the storage 2000 by the plurality of nanowire cells 1000 may be increased.

In FIGS. 1 to 3, the nanowire cells 1000, 1100, and 1200 are connected in series. However, the nanowire cells 1000, 1100, and 1200 may also be connected in parallel. For example, the first electrodes 1010, 1110, and 1210 may be connected to one another, and the second electrodes 1020, 1120, and 1220 may be connected to one another, using electrical conductors.

Figure 4:
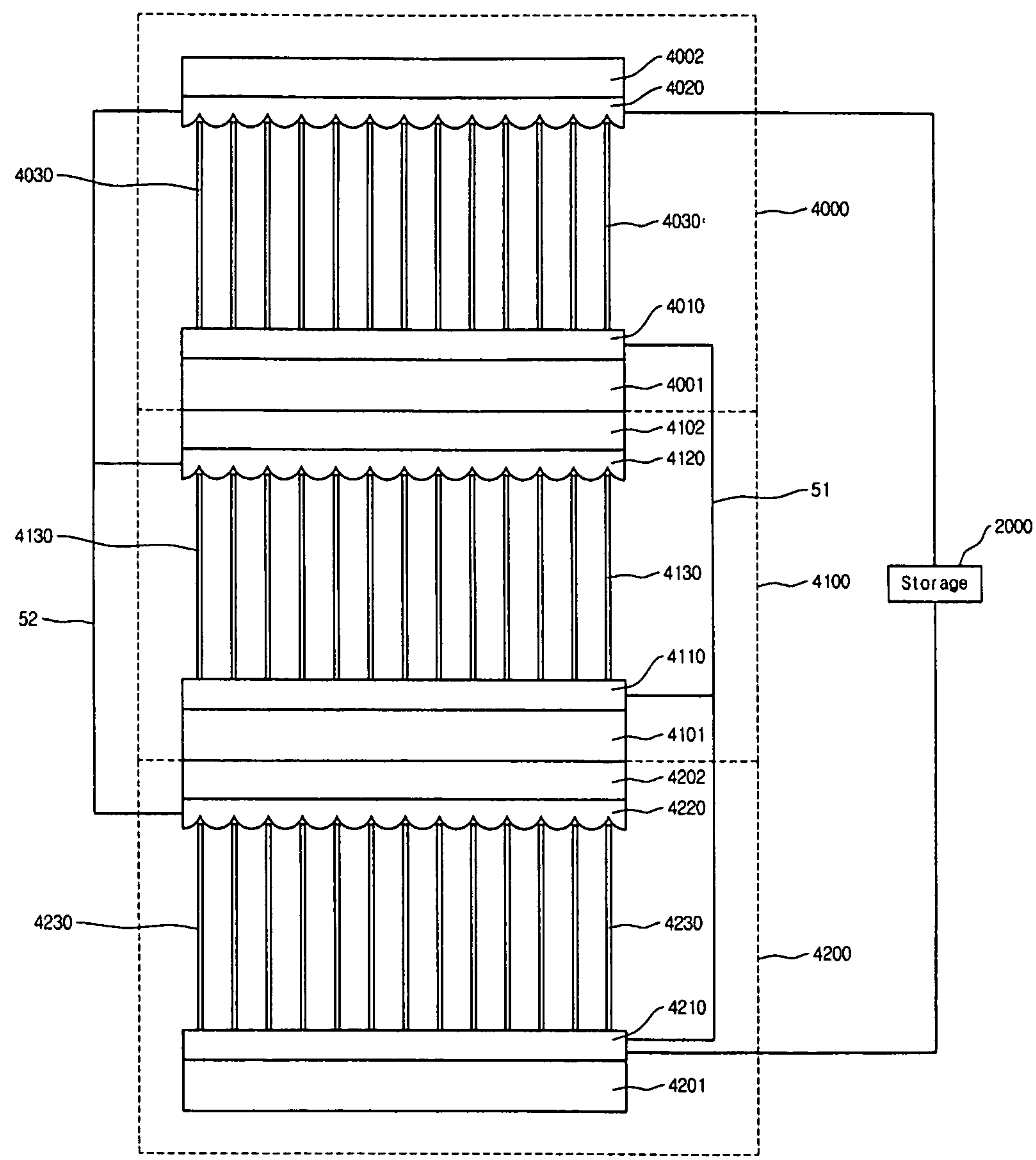
FIG. 4 is an exemplary schematic sectional view illustrating another embodiment of an apparatus for storing energy.

FIG. 4 is a sectional view illustrating another exemplary embodiment of an apparatus for storing energy according to the present invention.

Referring to FIG. 4, the apparatus for storing energy may include a plurality of nanowire cells 4000, 4100, and 4200 and a storage 2000. Since the internal structures of each of the nanowire cells 4000, 4100, and 4200 may be easily understood by those skilled in the art from the nanowire cells illustrated in FIGS. 1 to 3, a detailed description thereof will be omitted.

The nanowire cells 4000, 4100, and 4200 may disposed upon one another in a vertical direction as shown in the FIG. 4. Respective first electrodes 4010, 4110, and 4210 of the nanowire cells 4000, 4100, and 4200 may be connected to each other by a conductor 51. Similarly, respective second electrodes 4020, 4120, and 4220 of the nanowire cells 4000, 4100, and 4200 may be connected to each other by a conductor 52. Therefore, the nanowire cells 4000, 4100, and 4200 may be connected in parallel by the conductors 51 and 52. The storage 2000 may be connected to the nanowire cells 4000, 4100, and 4200, which are connected in parallel.

By connecting the nanowire cells 4000, 4100, and 4200 in parallel, the current flowing to the storage 2000 connected to the nanowire cells 4000, 4100, and 4200 may be increased. As a result, the efficiency in supplying power to the storage 2000 may be increased.

Figure 5:
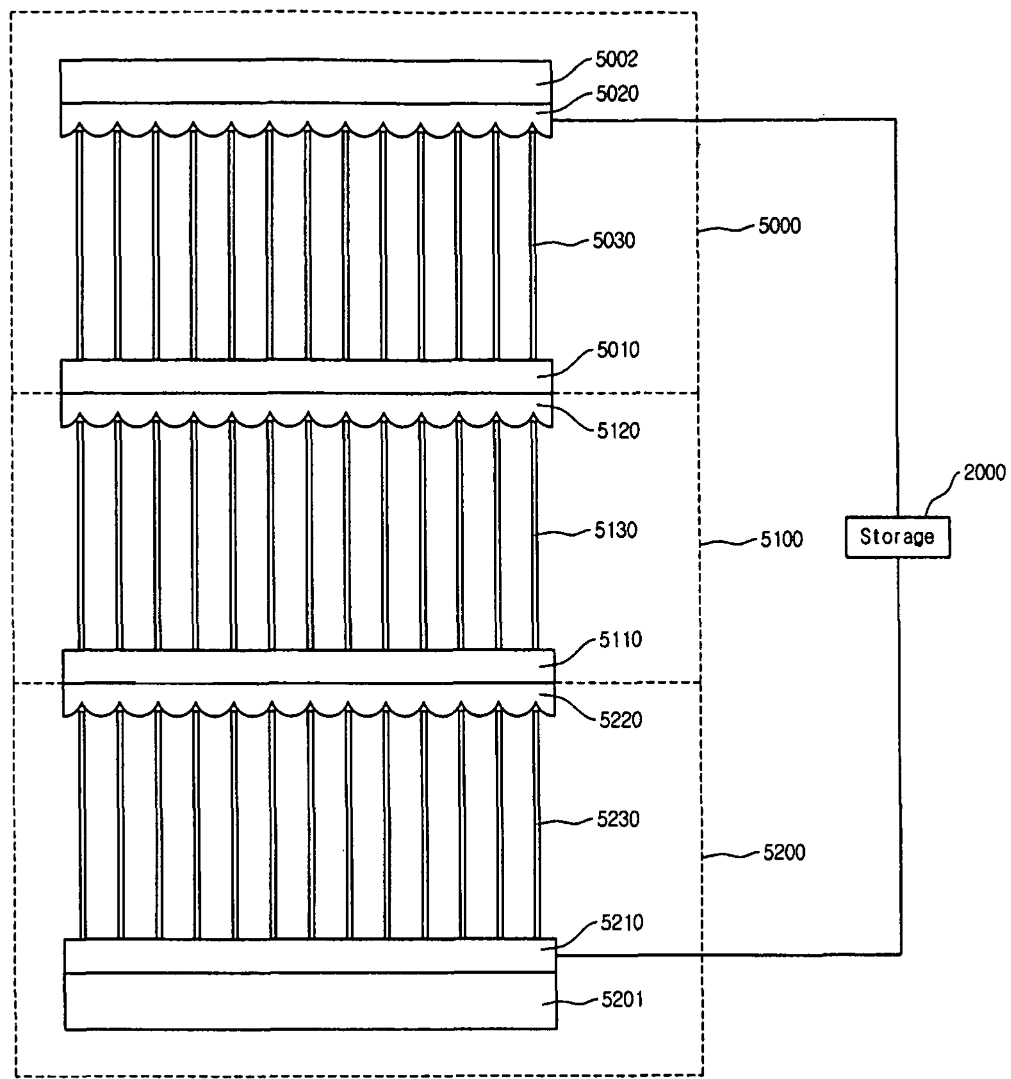
FIG. 5 is an exemplary schematic sectional view illustrating still another embodiment of an apparatus for storing energy.

FIG. 5 is a sectional view illustrating yet another exemplary embodiment of an apparatus for storing energy.

Referring to FIG. 5, the apparatus for storing energy may include a plurality of nanowire cells 5000, 5100, and 5200 and a storage 2000. Since the internal structures of each of the nanowire cells 5000, 5100, and 5200 may be understood by those skilled in the art from the nanowire cells illustrated in FIGS. 1 to 3, a detailed description thereof will be omitted.

The nanowire cells 5000, 5100, and 5200 may be disposed upon one another in a vertical direction. A first electrode 5010 of the nanowire cell 5000 may be electrically connected to a second electrode 5120 of the nanowire cell 5100. For example, the first electrode 5010 may be disposed on the second electrode 5120. Similarly, a first electrode 5110 of the nanowire cell 5100 may be electrically connected to a second electrode 5220 of the nanowire cell 5200.

The current that has been generated by the nanowire cell 5000 and reached the first electrode 5010 may directly flow to the second electrode 5120 located at the bottom of the first electrode 5010. The current that has reached the second electrode 5120 may flow to the first electrode 5110 through a nanowire 5130. Similarly, the current that has reached the first electrode 5110 may directly flow to the second electrode 5220 and flow through a nanowire 5230. In this manner, the nanowire cells 5000, 5100, and 5200 may be connected in series.

The storage 2000 may be connected to one or more of the nanowire cells 5000, 5100, and 5200 connected in series. For example, the storage 2000 may be connected between the second electrode 5020 of the nanowire cell 5000 and the first electrode 5210 of the nanowire cell 5200. By connecting the plurality of nanowire cells 5000, 5100, and 5200 in series, the voltage generated across all of the nanowire cells may be added together to produce a greatly increased total voltage for the storage 2000.

FIGS. 6A to 6E are exemplary sectional views illustrating a process for manufacturing the first electrode, the nanowire, and the connecting electrode of the apparatus for storing energy.

Figure 6A:
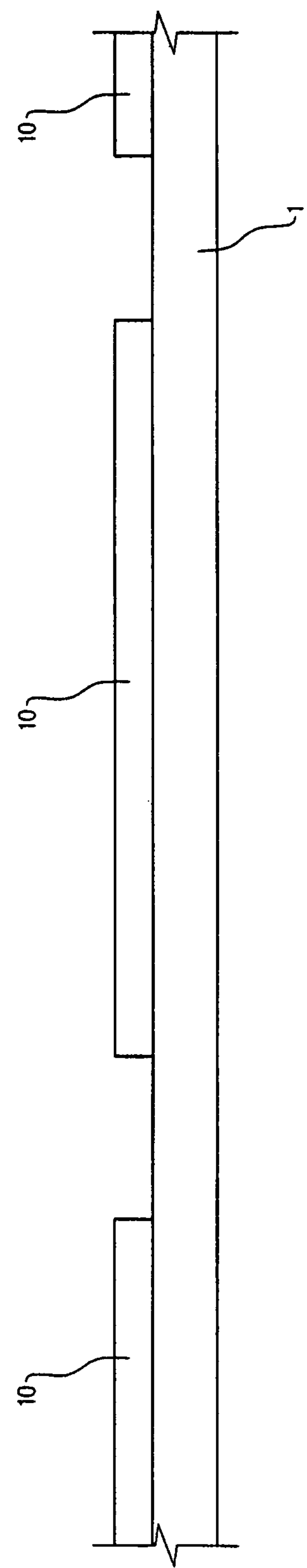
FIGS. 6A to 6E are exemplary sectional views illustrating processes for manufacturing a first electrode, a nanowire, and a connecting electrode in one method for manufacturing the apparatus for storing energy.

Referring to FIG. 6A, a plurality of first electrodes 10 may be formed on the substrate 1. The first electrode 10 may comprise a metal, ITO, CNT, or other suitable conductive materials. The substrate 1 may comprise glass, silicon (Si), a polymer, sapphire, GaN, SiC, or other suitable materials. The plurality of first electrodes 10 may be electrically separated from each other. The plurality of first electrodes 10 may be formed by forming an electrically conductive material layer on the entire surface of the substrate 1 and partially removing the formed layer. Alternatively, the plurality of first electrodes 10 may be formed by forming a mask such as a photoresist (PR) on a portion of the substrate 1, forming an electrically conductive material on the substrate 1, and removing the mask and the electrically conductive material disposed on the mask.

Figure 6B:
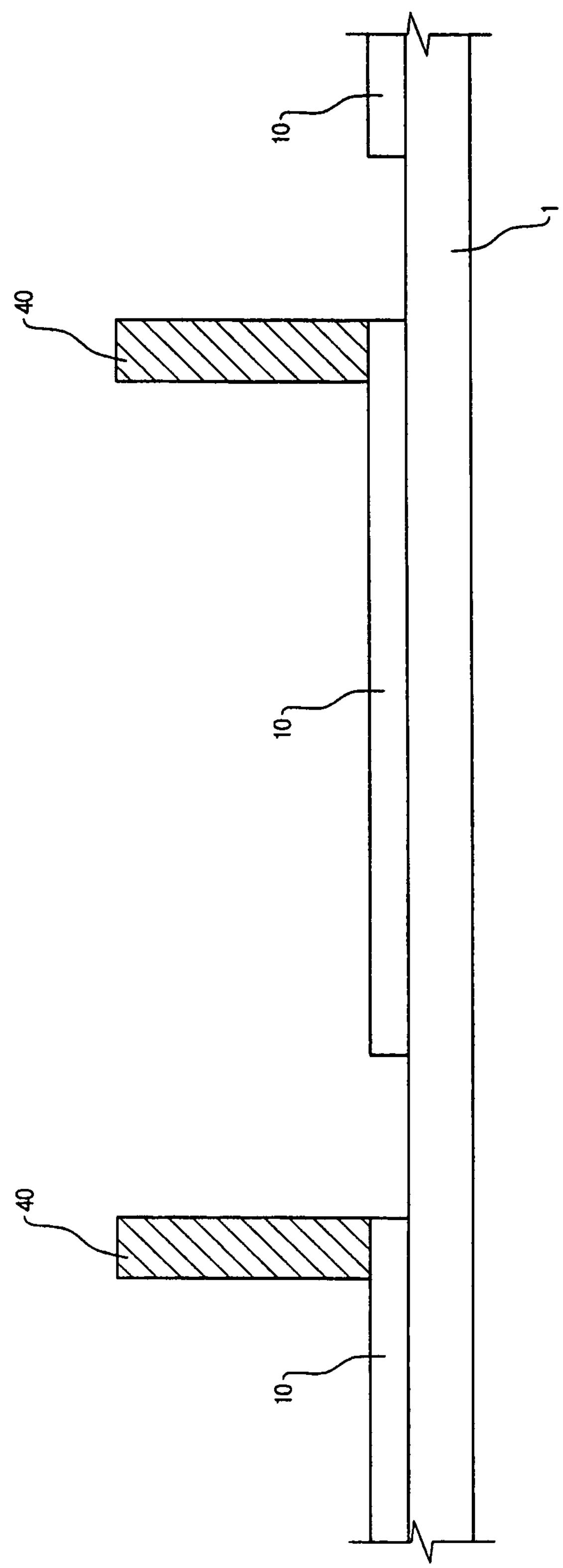

Referring to FIG. 6B, respective connecting electrodes 40 may be formed on each of the plurality of first electrodes 10. The connecting electrode 40 may be formed on a portion of the first electrode 10. The connecting electrode 40 may comprise a metal, ITO, CNT, or other suitable electrically conductive materials.

Figure 6C:
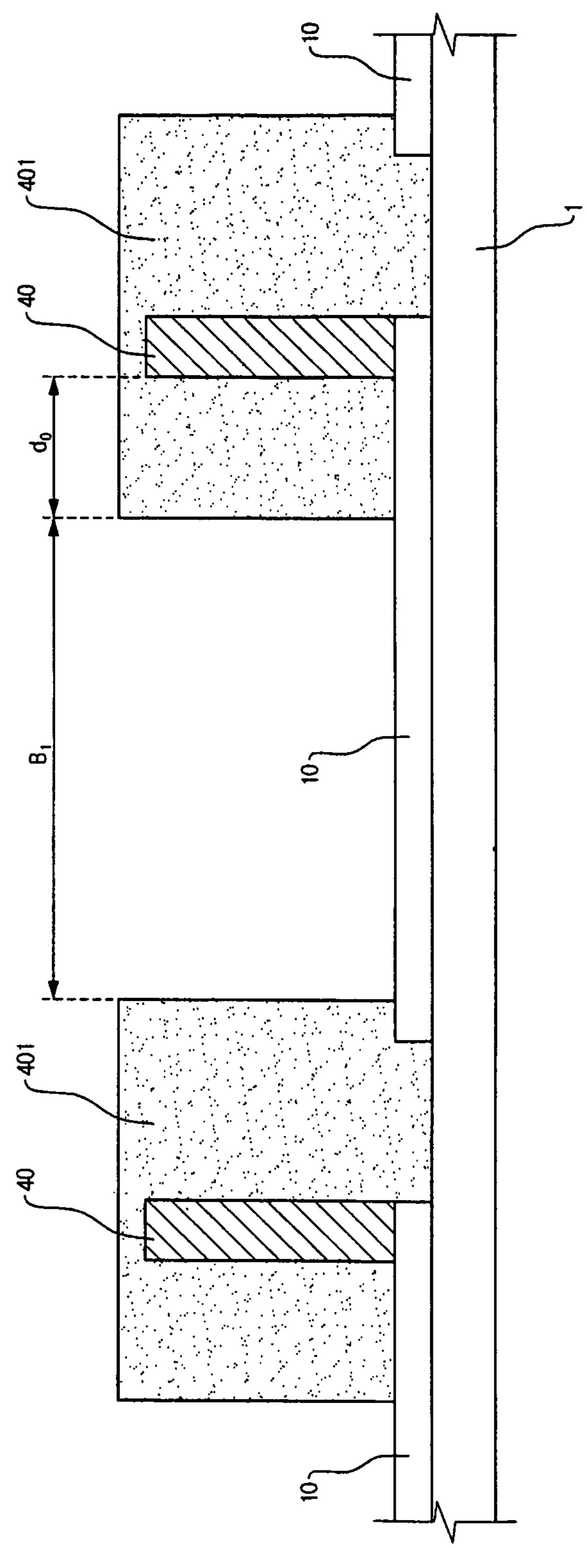

Referring to FIG. 6C, a photoresist (PR) layer 401 may be formed on the substrate 1. The PR layer 401 may be used for forming a mask on the area excluding the portions where the nanowires are to be formed. For example, the PR layer 401 may be formed to expose a predetermined area $B_1$ of the first electrode 10. The area for exposing the first electrode 10 may be disposed at a predetermined interval $d_0$ from the connecting electrode 40.

Figure 6D:
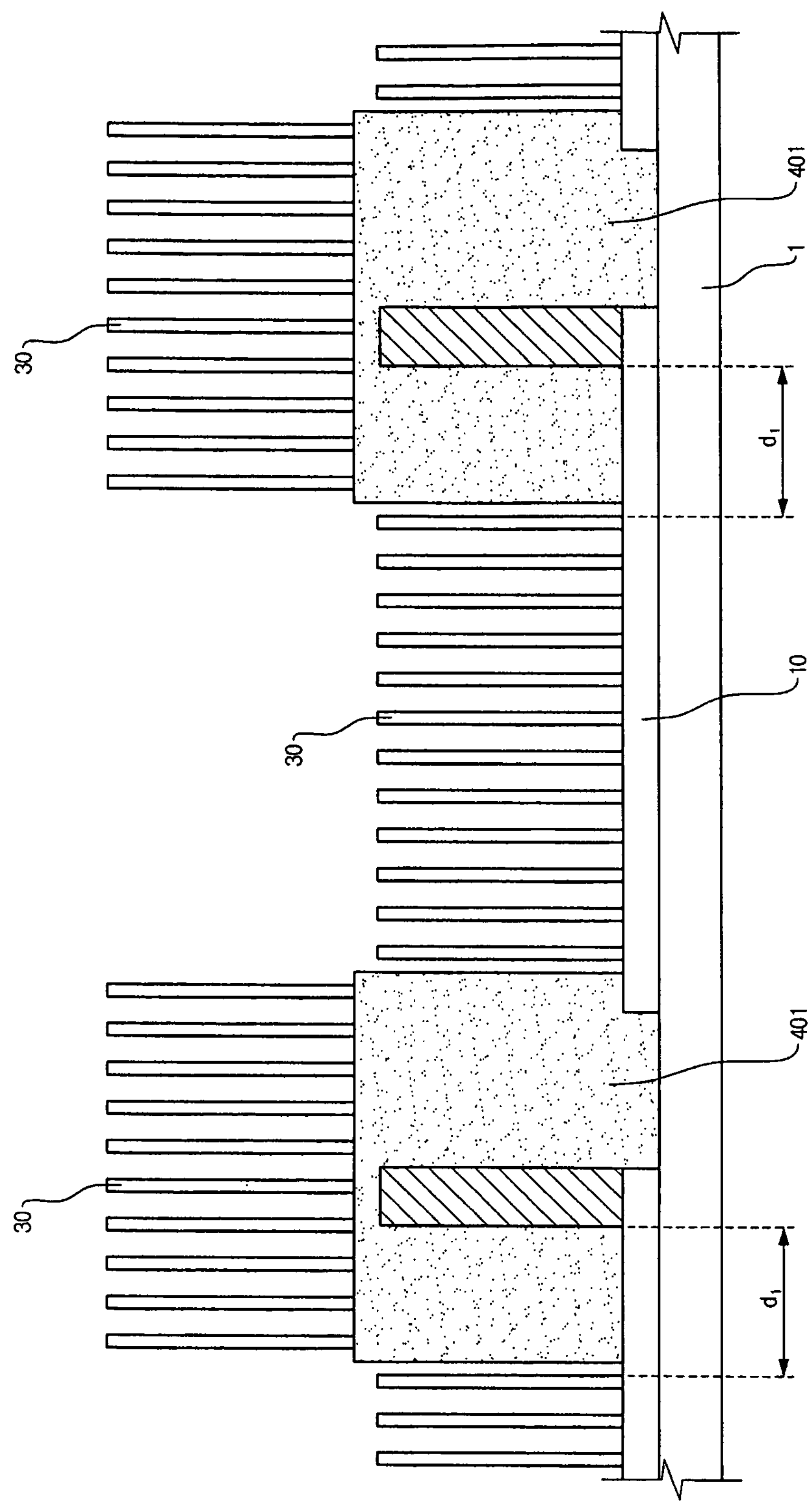

Referring to FIG. 6D, nanowires 30 may be formed on the substrate 1. The nanowire 30 may comprise ZnO. The nanowire 30 may be formed by forming nanomaterials on the substrate 1, heating the nanomaterials to generate nano-nuclei (not shown), and immersing the substrate 1 on which the nano-nuclei were generated into a solution of the nanomaterials. For example, the nanomaterial may include zinc acetate.

Figure 6E:
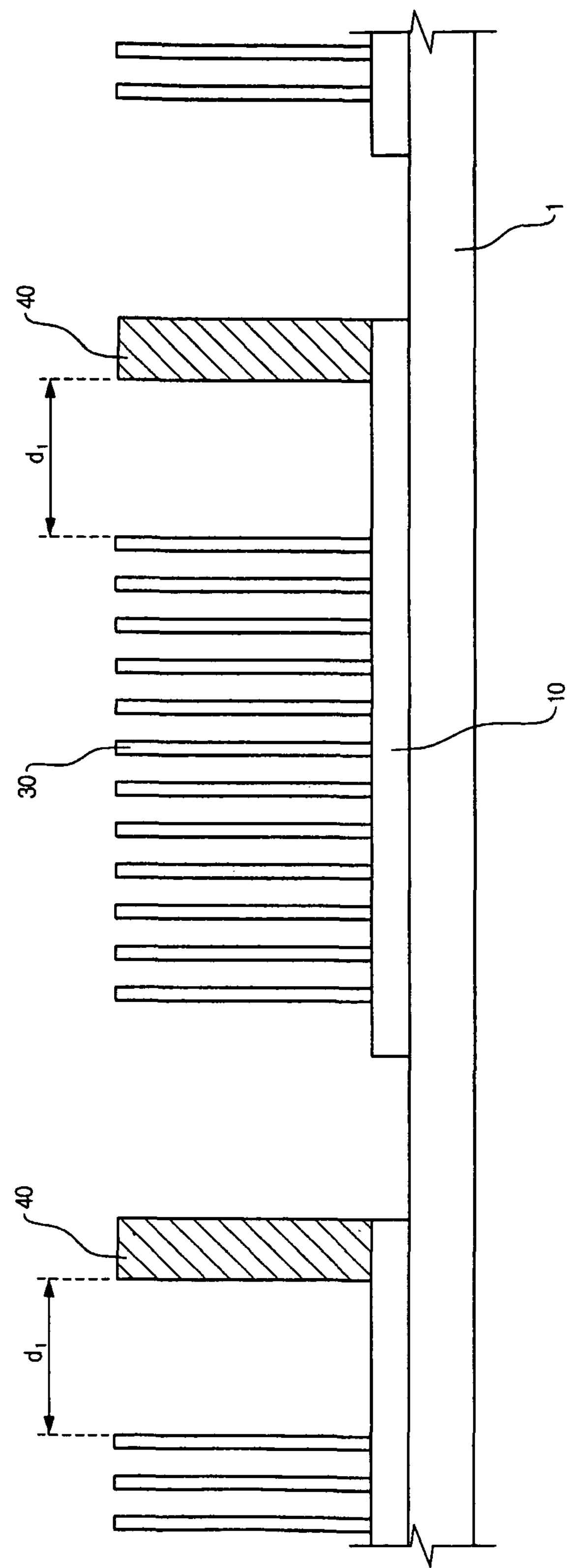

Referring to FIG. 6E, the PR layer 401 may be then removed. By removing the PR layer 401, the nanowires 30 formed on the PR layer 401 may be removed together. As a result, the nanowires 30 may be formed only on each of the plurality of first electrodes 10. The nanowire 30 of the first electrode 10 and the connecting electrode 40 may be disposed at a predetermined interval $d_1$.

FIGS. 7A to 7F are exemplary sectional views illustrating a process for manufacturing the first electrode, the nanowire, and the connecting electrode of the apparatus for storing energy.

Figure 7A:
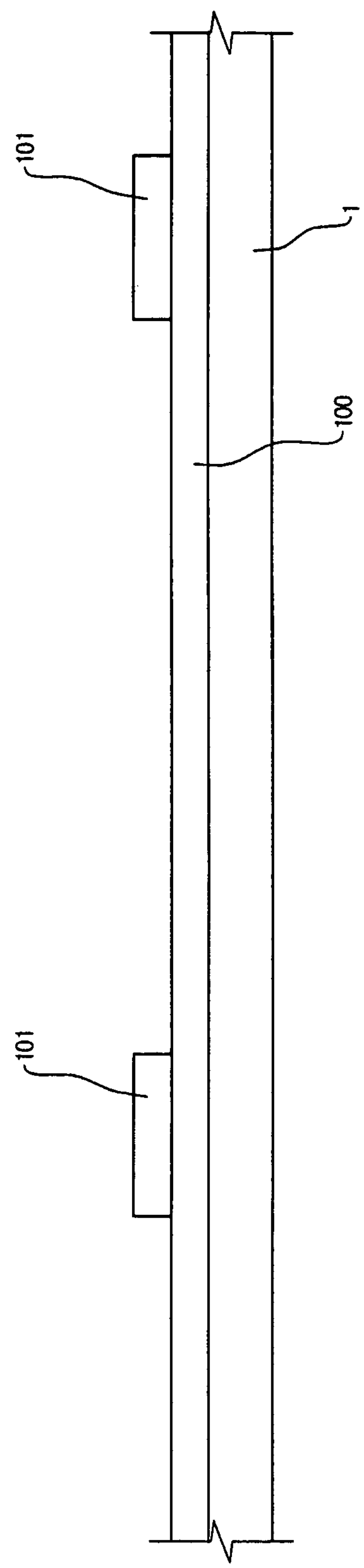
FIGS. 7A to 7F are exemplary sectional views illustrating processes for manufacturing a first electrode, a nanowire, and a connecting electrode in one method for manufacturing the apparatus for storing energy.

Referring to FIG. 7A, a first electrode layer 100 may be formed on the substrate 1. Next, a PR layer 101 may be formed on the first electrode layer 100. The PR layer 101 may serve as a mask for patterning the first electrode layer 100 and forming the plurality of electrodes to be electrically separated from each other. The PR layer 101 may be partially formed on the first electrode layer 100.

Figure 7B:
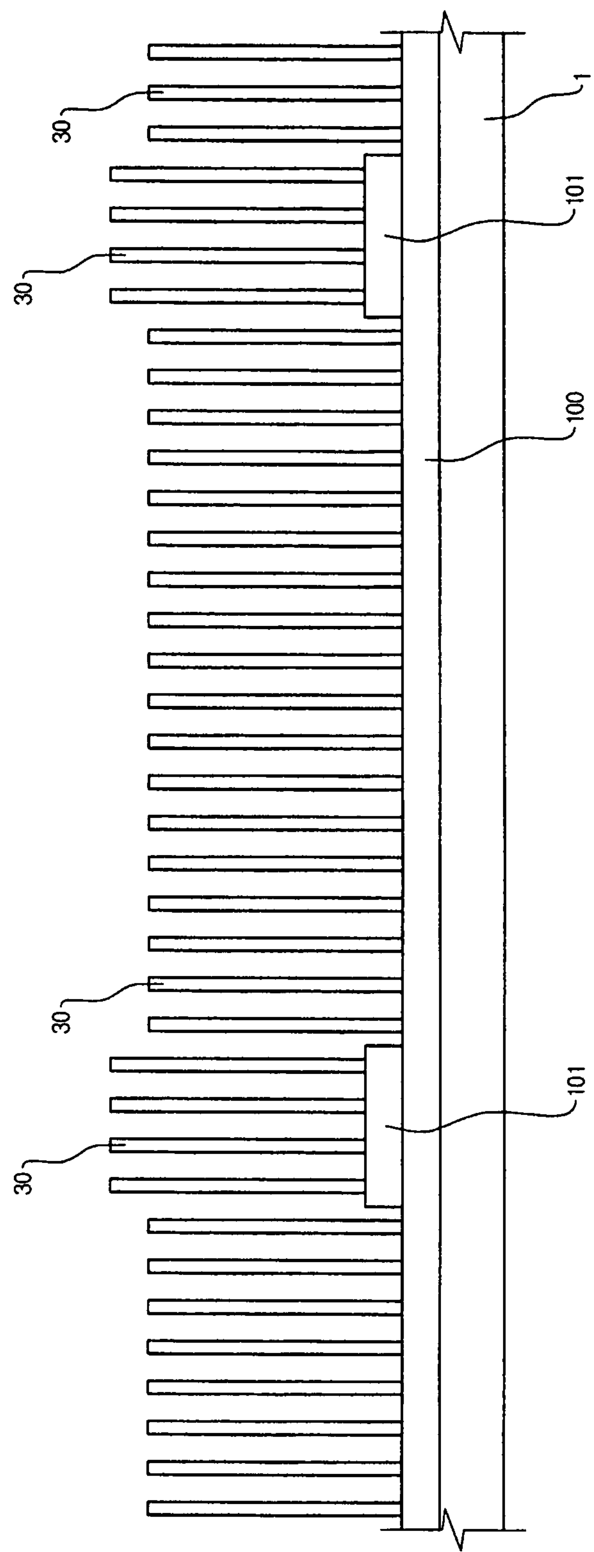

Referring to FIG. 7B, the nanowires 30 may be formed on the entire surface of the substrate 1. The nanowires 30 may be formed on the PR layer 101 and the first electrode layer 100. The nanowire 30 may comprise ZnO.

Figure 7C:
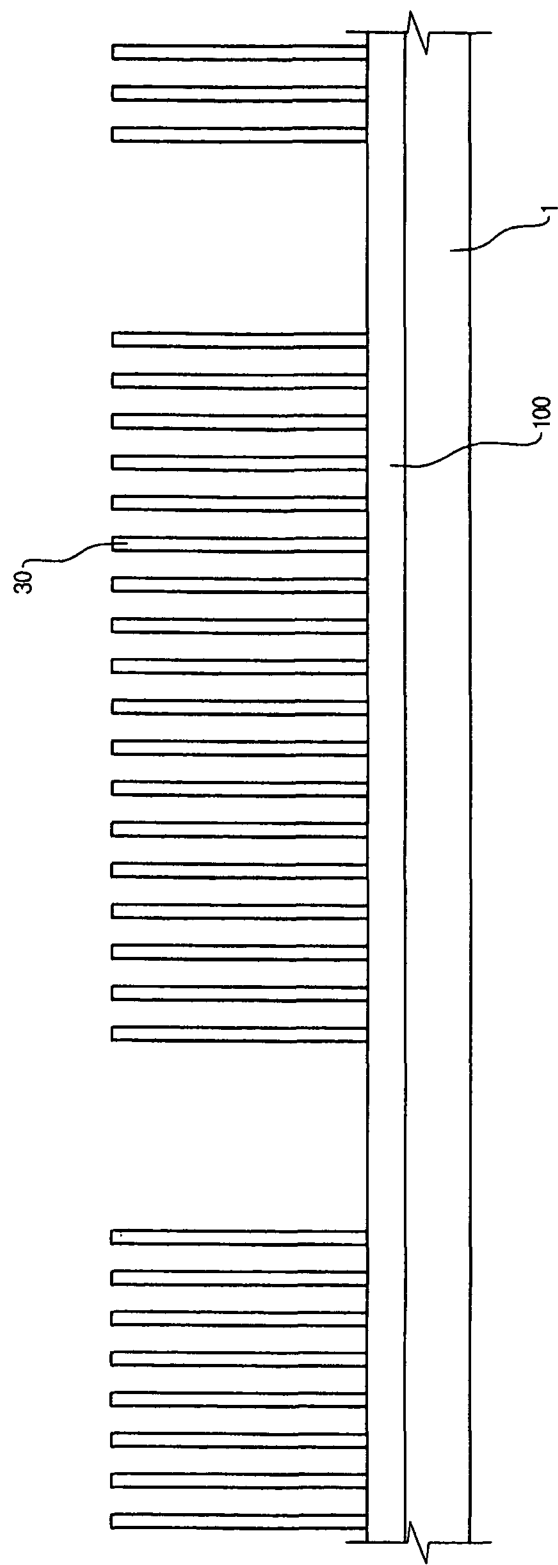

Referring to FIG. 7C, the PR layer 101 may then be removed. By removing the PR layer 101, the nanowires 30 formed on the PR layer 101 may be removed altogether. As the PR layer 101 is removed, the portion of the first electrode layer 100 on which the nanowires 30 are not formed may be exposed.

Referring to FIGS. 7A to 7C, the PR layer 101 may be formed on the substrate 1, the nanowires 30 may be formed on the entire surface of the substrate 1, and the PR layer 101 may be removed, thereby removing a portion of the nanowires 30. Alternatively, the nanowires 30 may be initially formed on the entire surface of the substrate 1, and a portion of the nanowires 30 may be removed by using a mask, thereby obtaining the structure illustrated in FIG. 7C.

Figure 7D:
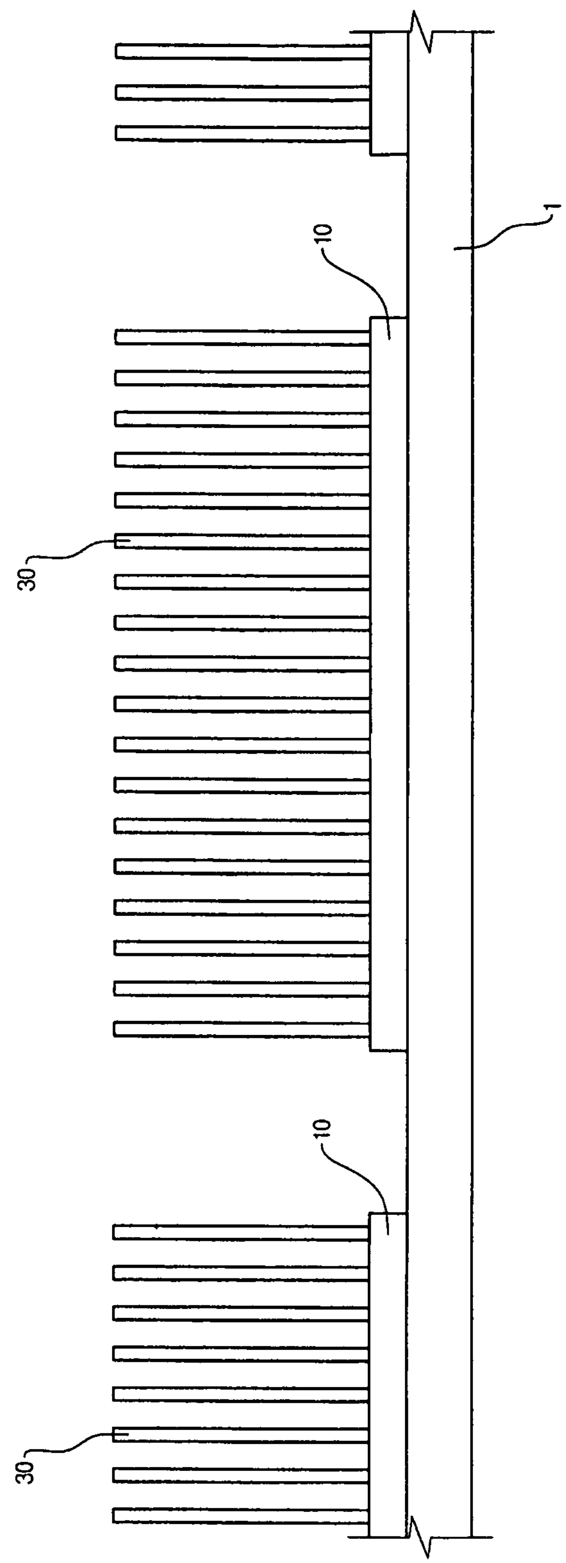

Referring to FIG. 7D, the exposed portions of the first electrode layer 100 may be removed. For example, the exposed portions of the first electrode layer 100 may be removed by wet etching or dry etching. By partially removing the first electrode layer 100, the plurality of first electrodes 10 that are electrically separated from each other may be formed. As described above, the nanowires 30 are disposed on each of the first electrodes 10.

Through the processes described above with reference to FIGS. 7A to 7D, the plurality of first electrodes 10 electrically separated from each other are formed with the nanowires 30 being disposed on each of the first electrodes 10. The first electrodes 10 may be formed on the same single substrate 1. Alternatively, each of the first electrodes 10 may be formed on a different substrate.

The processes illustrated in the FIGS. 7A through 7D, may be performed in any desired sequence. For example, the process illustrated in FIG. 7D may be performed in advance of the processes illustrated in FIGS. 7A to 7C. For example, after forming the plurality of first electrodes 10 from the first electrode layer 100, the nanowires 30 may be formed on each of the first electrodes 10.

Figure 7E:
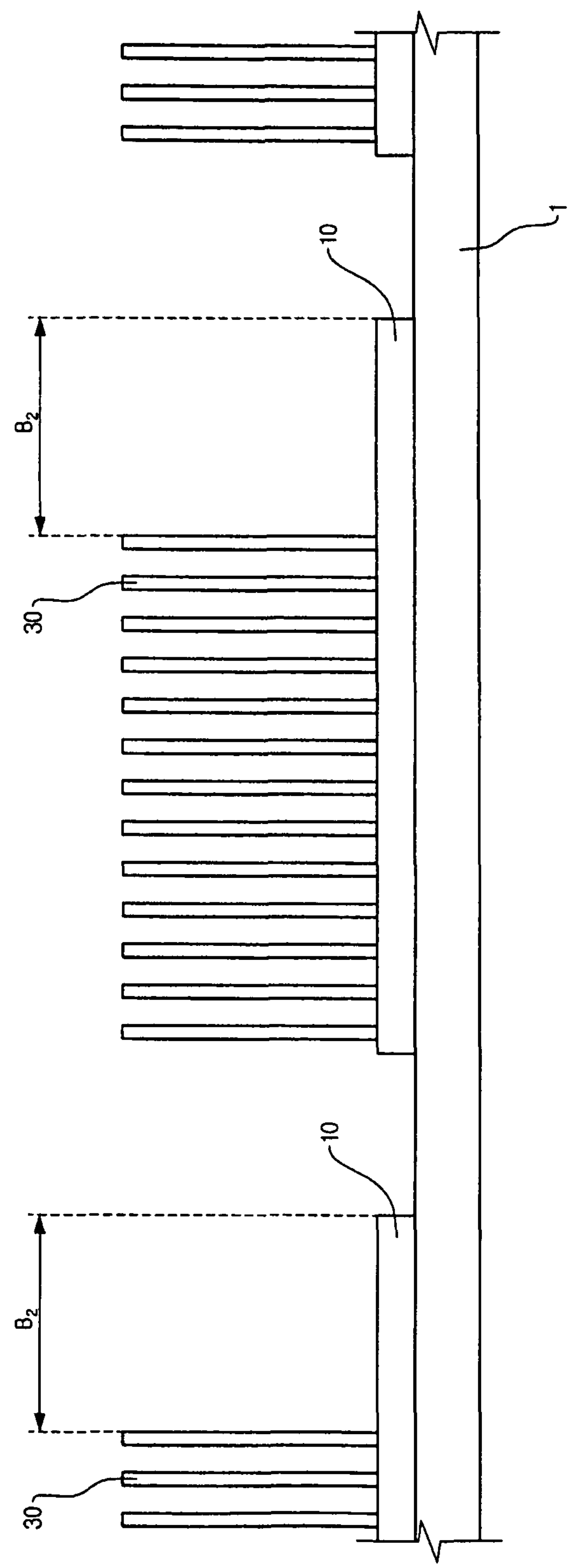

Referring to FIG. 7E, the nanowires 30 in a predetermined area $B_2$ of the first electrodes 10 may be removed. By partially removing the nanowires 30, electrical failure (shorting) caused by connection between the nanowire 30 and the connecting electrode that is to be formed may be prevented. Alternatively, when the nanowires 30 are initially formed, the nanowires 30 may not be formed on the predetermined area $B_2$ of the first electrode 10.

Figure 7F:
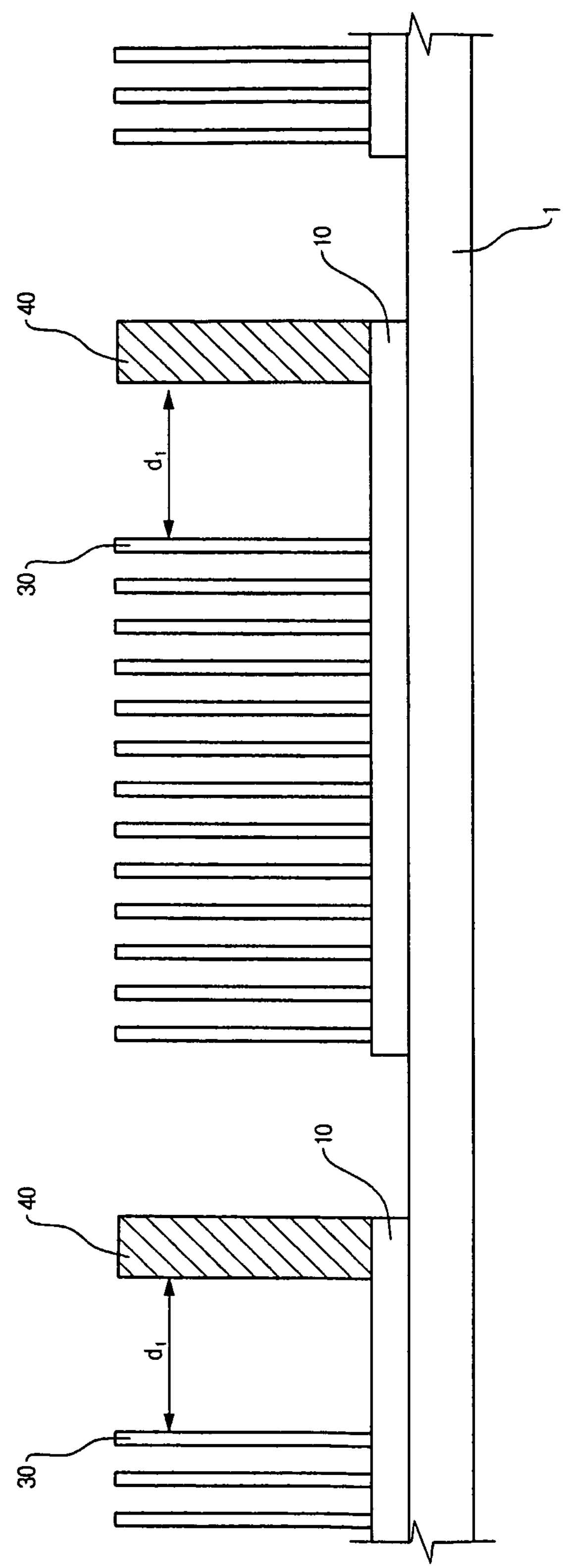

Referring to FIG. 7F, the connecting electrode 40 may be formed on each of the first electrode 10. The connecting electrode 40 may comprise metal, ITO, CNT, or other suitable conductive materials. The connecting electrode 40 and the adjacent nanowire 30 may be disposed at a predetermined interval $d_1$ to prevent the electrical failure.

FIGS. 8A to 8D are exemplary sectional views illustrating a process for manufacturing the second electrode of the apparatus for storing energy.

Figure 8A:
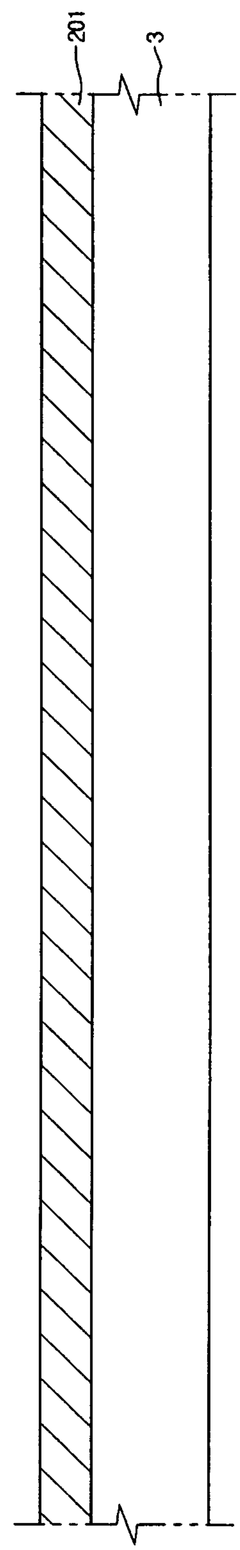
FIGS. 8A to 8H are exemplary sectional views illustrating a process for manufacturing a second electrode for an apparatus for storing energy.

Referring to FIG. 8A, a metal layer 201 may be formed on a template substrate 3. The substrate 3 may be a silicon wafer or be formed of other suitable materials. The metal layer 201 may include aluminum (Al) or other suitable conductive materials.

Figure 8B:
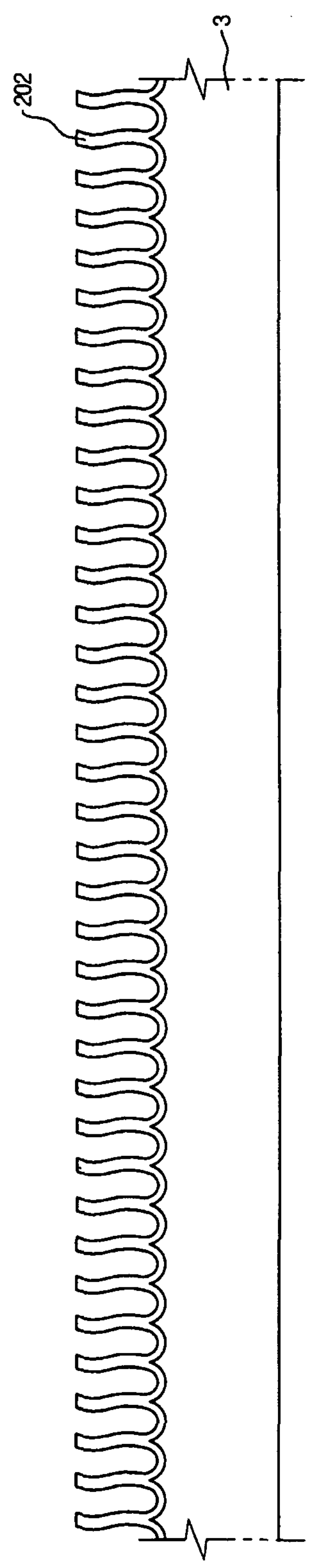

Referring to FIG. 8B, an anodizing layer 202 may be formed by anodizing the metal layer 201. The anodizing is conducted by electrolysis in an electrolyte solution using the metal layer 201 as a cathode. Through the anodizing process, the components of the metal layer 201 may be dissolved into the electrolyte, and at the same time, the thickness of an oxide layer spontaneously formed on the metal layer 201 may increase. Accordingly, the anodizing layer 202 illustrated in FIG. 8B may be formed.

Figure 8C:
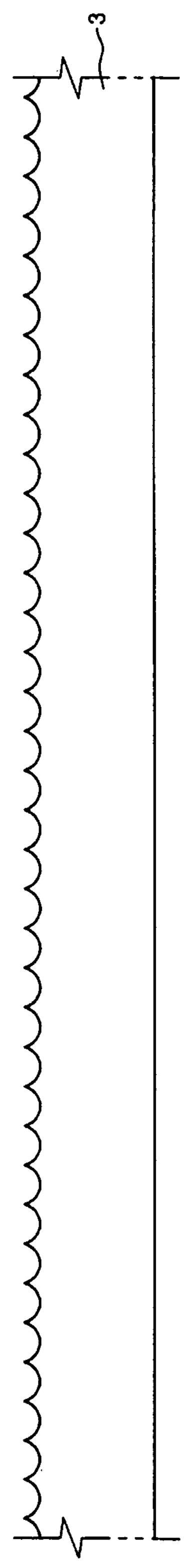

Referring to FIG. 8C, the anodizing layer 202 may be removed. For example, the anodizing layer 202 may be removed by wet etching or dry etching. After the removal of the anodizing layer 202, the template substrate 3 may have an uneven portion having a structure that has the ripple shape described earlier.

Figure 8D:
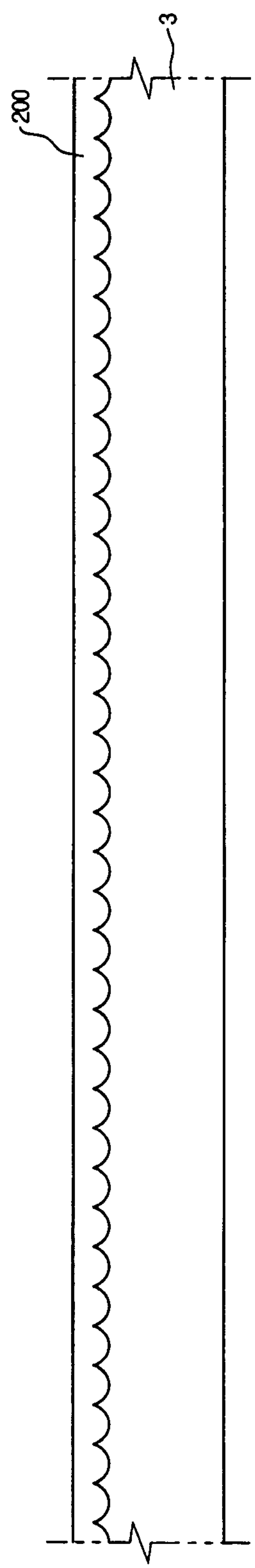

Referring to FIG. 8D, a second electrode layer 200 may be formed on the template substrate 3. The second electrode layer 200 may be patterned as an upper electrode, which allows current flow from the electrode 200 to the nanowire through contacts with the nanowire. The second electrode layer 200 may comprise metal, ITO, CNT, or other suitable conductive materials. The second electrode layer 200 may be formed by ion sputtering or other suitable methods.

Figure 8E:
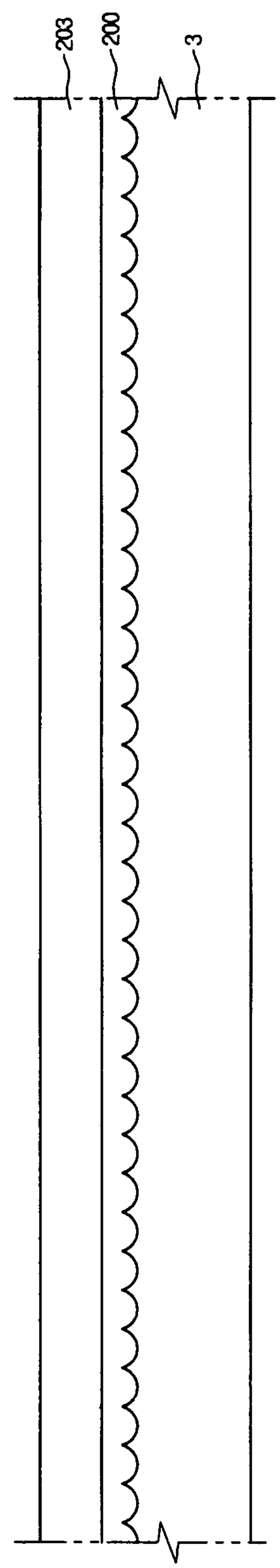

Referring to FIG. 8E, an adhesive layer 203 may be formed on the second electrode 200. The adhesive layer 203 may increase adhesion between the second electrode 200 and a transfer substrate that is to be formed. The adhesive layer 203 may comprise nickel (Ni) or other suitable materials for adhesion. The adhesive layer 203 may be formed by electroplating or other suitable methods.

Figure 8F:
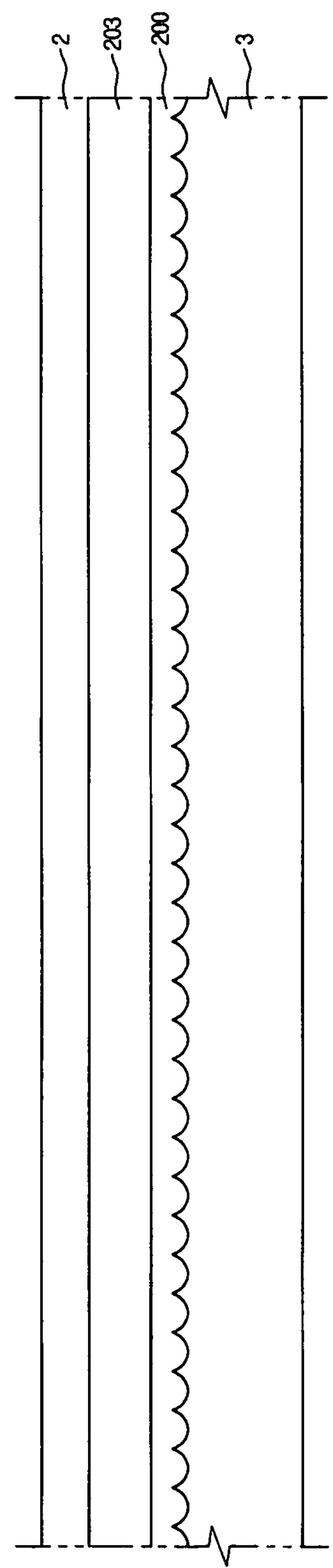

Referring to FIG. 8F, the transfer substrate 2 may be joined to the adhesive layer 203. Alternatively, the transfer substrate 2 may be joined to the second electrode layer 200 without the adhesive layer 203. The transfer substrate 2 may include polymer or other suitable materials.

Figure 8G:
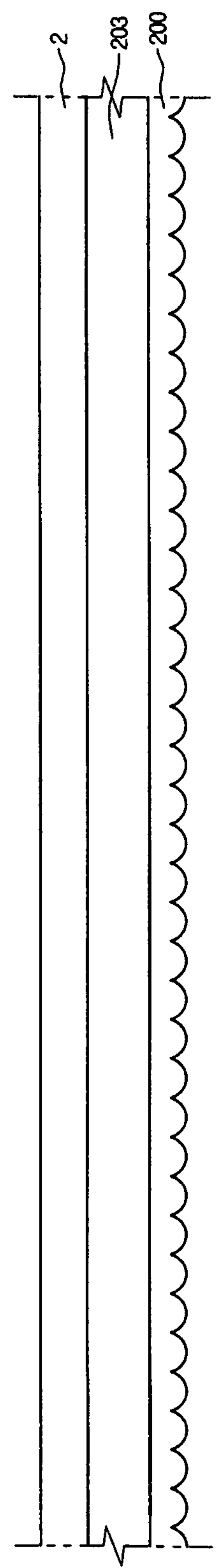

Referring to FIG. 8G, the second electrode layer 200, the adhesive layer 203, and the transfer substrate 2 may be separated from the template substrate 3. The separated second electrode layer 200 may include an uneven portion having concave portions and convex portions due to the shape of the template substrate 3. Through the processes described with reference to FIGS. 8A to 8E, the second electrode layer 200 having the uneven portion may be formed. Alternatively, the second electrode layer 200 may not include the uneven portion. For example, the second electrode layer 200 may possess the shape of a flat plate.

Figure 8H:
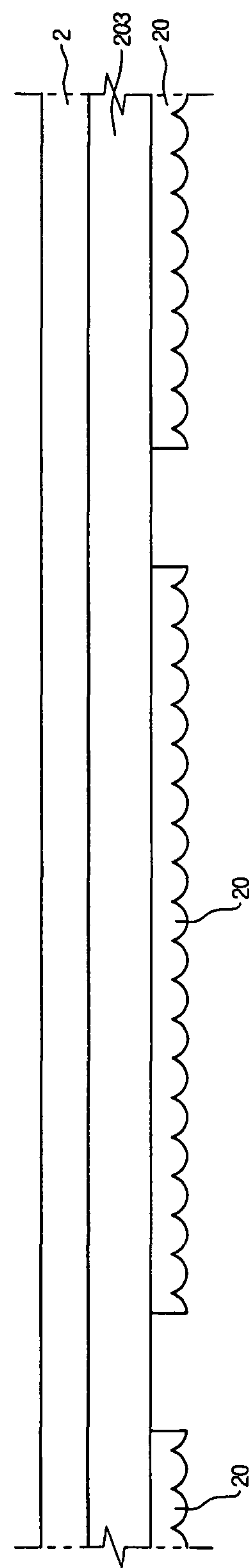

Referring to FIG. 8H, the plurality of second electrodes 20 that are electrically separated from each other may be formed by patterning the second electrode layer 200. The second electrode 20 formed as described above may be patterned to connect the nanowire cells in series or in parallel. For example, in the case of a series connection for increasing voltage, the plurality of second electrodes 20 may be arranged so that the second electrode 20 of the post-nanowire cell contacts the connecting electrode of the pre-nanowire cell.

Figure 9:
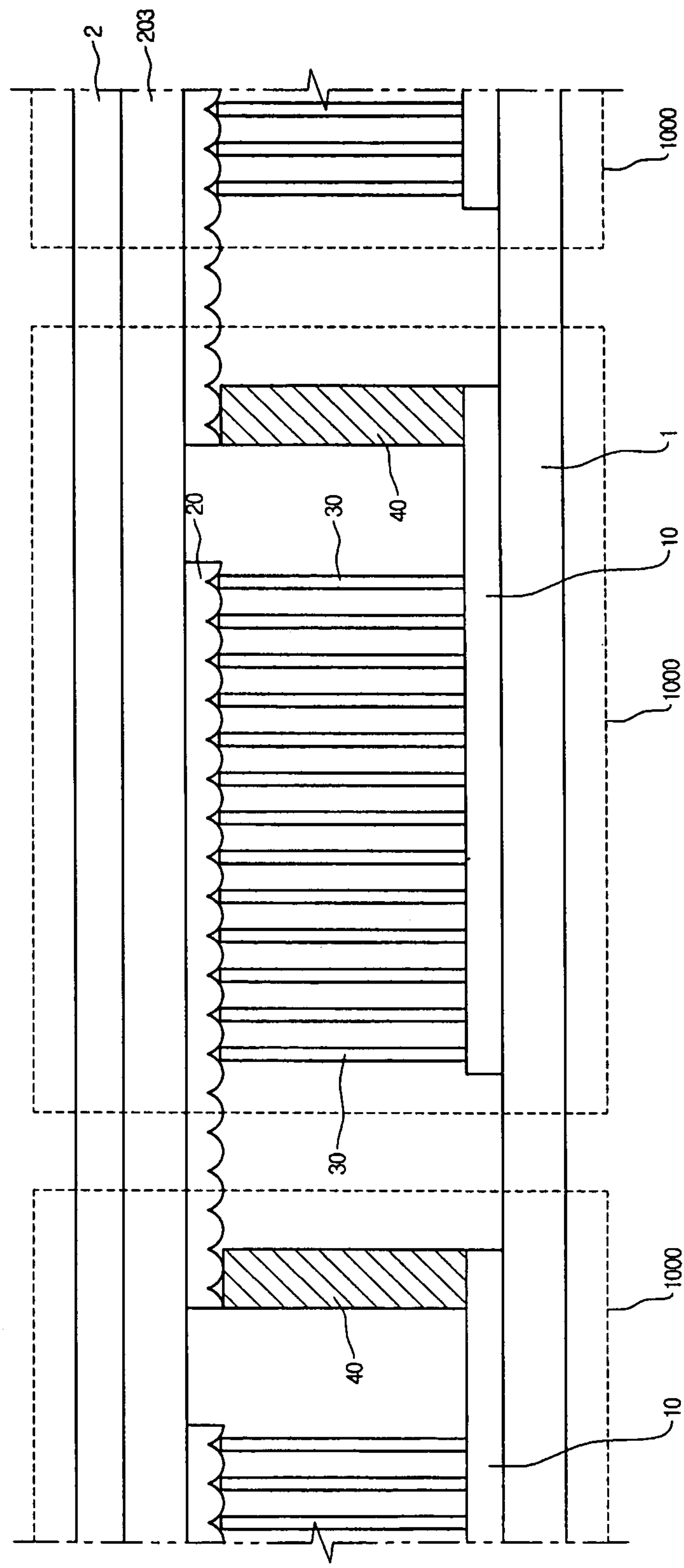
FIG. 9 is an exemplary sectional view illustrating a process for electrically connecting the second electrode to the connecting electrode in one method for manufacturing the apparatus for storing energy.

FIG. 9 is an exemplary sectional view illustrating a process for electrically connecting the second electrode with the connecting electrode in the apparatus for storing energy.

Referring to FIG. 9, the nanowire cells 1000 may be formed by arranging the plurality of second electrodes 20 to face the corresponding first electrodes 10. Each of the second electrodes 20 may be disposed to be adjacent to the nanowire 30 on the facing first electrode 10. For example, the second electrode 20 may be disposed to be in contact with the nanowire 30 or separated from the nanowires 30 at a predetermined distance. The second electrodes 20 may be electrically separated from each other. In addition, the second electrodes 20 may be formed on the same single substrate 2. Alternatively, each of the second electrodes 20 may be formed on a different substrate.

The nanowire cells 1000 may be electrically connected to each other via the connecting electrode 40. The connecting electrode 40 formed on the first electrode 10 of the nanowire cell 1000 may be electrically connected to the second electrode 20 of the adjacent nanowire cell 1000. When the nanowire 30 comes in contact with the second electrode 20 as a stress is applied or the nanowire 30 resonates, current may flow between the adjacent nanowire cells 1000 through the connecting electrode 40. As a result, the nanowire cells 1000 may be connected in series. Alternatively, the nanowire cells 1000 may be connected in parallel depending on the shapes of the connecting electrode 40 and the second electrode 20.

The apparatus for storing energy may be manufactured by connecting the storage (2000, see FIG. 1) to the nanowire cells 1000 connected in series or in parallel. For example, the storage 2000 may be connected to the nanowire cells 1000 disposed at both ends from among the nanowire cells 1000 connected in series. The storage 2000 may comprise a chargeable battery or a capacitor. For example, the storage 2000 may comprise a nickel-cadmium battery, a nickel-hydrogen battery, a lithium ion battery, or a lithium polymer battery. In addition, the storage 2000 may include an amplifier for amplifying voltage.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An apparatus for storing energy comprising:

a plurality of nanowire cells electrically connected to each other; and a storage for storing electrical energy generated in the plurality of nanowire cells, the plurality of nanowire cells being in electrical communication with the storage;

wherein each of the plurality of nanowire cells includes:

first and second electrodes disposed at an interval; and a nanowire which is disposed between the first and the second electrodes and made of a piezoelectric material; wherein an end of the nanowire contacts either the first electrode or the second electrode.

2. The apparatus according to claim 1, wherein the plurality of nanowire cells are connected in series.

3. The apparatus according to claim 2, wherein the plurality of nanowire cells are divided into pre-nanowire cells and post-nanowire cells based on the direction of the flow of current, and wherein the first electrode of the pre-nanowire cell is electrically connected to the second electrode of the post-nanowire cell.

4. The apparatus according to claim 3, wherein each of the plurality of nanowire cells further includes a connecting electrode which is disposed on the first electrode of the pre-nanowire cell and is electrically connected to the second electrode of the post-nanowire cell.

5. The apparatus according to claim 4, wherein the connecting electrode and the nanowire are separated from each other by a distance.

6. The apparatus according to claim 3, wherein the first electrode of the pre-nanowire cell is disposed on the second electrode of the post-nanowire cell.

7. The apparatus according to claim 1, wherein the plurality of nanowire cells are connected in parallel.

8. The apparatus according to claim 1, wherein the storage includes a rechargeable battery or a capacitor.

9. The apparatus according to claim 8, wherein the storage includes a nickel-cadmium battery, a nickel-hydrogen battery, a lithium ion battery, or a lithium polymer battery.

10. The apparatus according to claim 1, wherein the storage includes an amplifier for increasing voltage.

* * * * *